United States Patent
Zewail et al.

(10) Patent No.: US 11,924,887 B2
(45) Date of Patent: Mar. 5, 2024

(54) CAPABILITY REPORTING FOR RANDOM ACCESS CHANNEL PROCEDURE

(71) Applicant: QUALCOMM Incorporated, San Diego, CA (US)

(72) Inventors: Ahmed Abdelaziz Ibrahim Abdelaziz Zewail, San Diego, CA (US); Tao Luo, San Diego, CA (US); Xiaoxia Zhang, San Diego, CA (US); Qiang Wu, San Diego, CA (US); Jun Ma, San Diego, CA (US); Iyab Issam Sakhnini, San Diego, CA (US); Jing Sun, San Diego, CA (US); Mehmet Izzet Gurelli, San Diego, CA (US); Anantha Krishna Karthik Nagarajan, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/305,064

(22) Filed: Jun. 30, 2021

(65) Prior Publication Data
US 2022/0007434 A1  Jan. 6, 2022

Related U.S. Application Data

(60) Provisional application No. 63/046,922, filed on Jul. 1, 2020.

(51) Int. Cl.
*H04W 74/08* (2009.01)
*H04L 5/14* (2006.01)
(Continued)

(52) U.S. Cl.
CPC .......... *H04W 74/0841* (2013.01); *H04L 5/14* (2013.01); *H04W 56/001* (2013.01); *H04W 74/008* (2013.01)

(58) Field of Classification Search
CPC .... H04L 5/14; H04W 56/001; H04W 74/008; H04W 74/0841
See application file for complete search history.

(56) References Cited

U.S. PATENT DOCUMENTS

| | | | |
|---|---|---|---|
| 2008/0194259 A1* | 8/2008 | Vujcic | H04W 74/0833 455/435.1 |
| 2010/0208674 A1* | 8/2010 | Lee | H04W 36/0088 370/329 |

(Continued)

FOREIGN PATENT DOCUMENTS

WO   WO-2018031638 A1 *  2/2018

*Primary Examiner* — Stephen J Clawson
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment may receive, from a base station, an indication of a time gap value associated with a random access channel (RACH) procedure, wherein the time gap value is based at least in part on a capability of the base station, determine whether a physical RACH (PRACH) occasion associated with the RACH procedure is valid based at least in part on receiving the indication of the time gap value associated with the RACH procedure, and selectively transmit, to the base station, a PRACH transmission in the PRACH occasion based at least in part on determining whether the PRACH occasion is valid. Numerous other aspects are provided.

30 Claims, 9 Drawing Sheets

(51) Int. Cl.
*H04W 56/00* (2009.01)
*H04W 74/00* (2009.01)

(56) References Cited

U.S. PATENT DOCUMENTS

| | | | |
|---|---|---|---|
| 2013/0272226 A1* | 10/2013 | Li | H04L 1/0061 |
| | | | 370/329 |
| 2015/0003410 A1* | 1/2015 | Yang | H04W 36/0058 |
| | | | 370/331 |
| 2018/0263064 A1* | 9/2018 | Islam | H04L 27/2602 |
| 2019/0223157 A1* | 7/2019 | Hwang | H04L 27/26025 |
| 2020/0053637 A1* | 2/2020 | Tsai | H04L 5/001 |
| 2020/0221506 A1* | 7/2020 | Jeon | H04W 74/0808 |
| 2020/0351955 A1* | 11/2020 | Jeon | H04L 1/1642 |
| 2022/0191936 A1* | 6/2022 | Shin | H04W 74/0833 |

* cited by examiner

CAPABILITY REPORTING FOR RANDOM ACCESS CHANNEL PROCEDURE

CROSS-REFERENCE TO RELATED APPLICATION

This patent application claims priority to U.S. Provisional Patent Application No. 63/046,922, filed on Jul. 1, 2020, entitled "CAPABILITY REPORTING FOR RANDOM ACCESS CHANNEL PROCEDURE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for capability report for a random access channel (RACH) procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, an indication of a time gap value associated with a random access channel (RACH) procedure, wherein the time gap value is based at least in part on a capability of the base station; determining whether a physical RACH (PRACH) occasion associated with the RACH procedure is valid based at least in part on receiving the indication of the time gap value associated with the RACH procedure; and selectively transmitting, to the base station, a PRACH transmission in the PRACH occasion based at least in part on determining whether the PRACH occasion is valid.

In some aspects, a method of wireless communication, performed by a base station, may include determining a time gap value associated with a RACH procedure based at least in part on a capability of the base station; and transmitting an indication of the time gap value associated with the RACH procedure based at least in part on determining the time gap value associated with the RACH procedure.

In some aspects, a non-transitory computer-readable medium may store one or more instructions for wireless communication. The one or more instructions, when executed by one or more processors of a UE, may cause the one or more processors to receive, from a base station, an indication of a time gap value associated with a RACH procedure, wherein the time gap value is based at least in part on a capability of the base station; determine whether a PRACH occasion associated with the RACH procedure is valid based at least in part on receiving the indication of the time gap value associated with the RACH procedure; and selectively transmit, to the base station, a PRACH transmission in the PRACH occasion based at least in part on determining whether the PRACH occasion is valid.

In some aspects, a non-transitory computer-readable medium may store one or more instructions for wireless communication. The one or more instructions, when executed by one or more processors of a base station, may cause the one or more processors to determine a time gap value associated with a RACH procedure based at least in part on a capability of the base station; and transmit an indication of the time gap value associated with the RACH procedure based at least in part on determining the time gap value associated with the RACH procedure.

In some aspects, a UE for wireless communication may include a memory and one or more processors, coupled to the memory, configured to: receive, from a base station, an indication of a time gap value associated with a RACH procedure, wherein the time gap value is based at least in part on a capability of the base station; determine whether a PRACH occasion associated with the RACH procedure is valid based at least in part on receiving the indication of the time gap value associated with the RACH procedure; and selectively transmit, to the base station, a PRACH transmission in the PRACH occasion based at least in part on determining whether the PRACH occasion is valid.

In some aspects, a base station for wireless communication may include a memory and one or more processors, coupled to the memory, configured to: determine a time gap value associated with a RACH procedure based at least in part on a capability of the base station; and transmit an indication of the time gap value associated with the RACH procedure based at least in part on determining the time gap value associated with the RACH procedure.

In some aspects, an apparatus for wireless communication may include means for receiving, from a base station, an indication of a time gap value associated with a RACH procedure, wherein the time gap value is based at least in part on a capability of the base station; means for determining whether a PRACH occasion associated with the RACH procedure is valid based at least in part on receiving the indication of the time gap value associated with the RACH procedure; and means for selectively transmitting, to the base station, a PRACH transmission in the PRACH occasion based at least in part on determining whether the PRACH occasion is valid.

In some aspects, an apparatus for wireless communication may include means for determining a time gap value associated with a RACH procedure based at least in part on a capability of the apparatus; and means for transmitting an indication of the time gap value associated with the RACH procedure based at least in part on determining the time gap value associated with the RACH procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
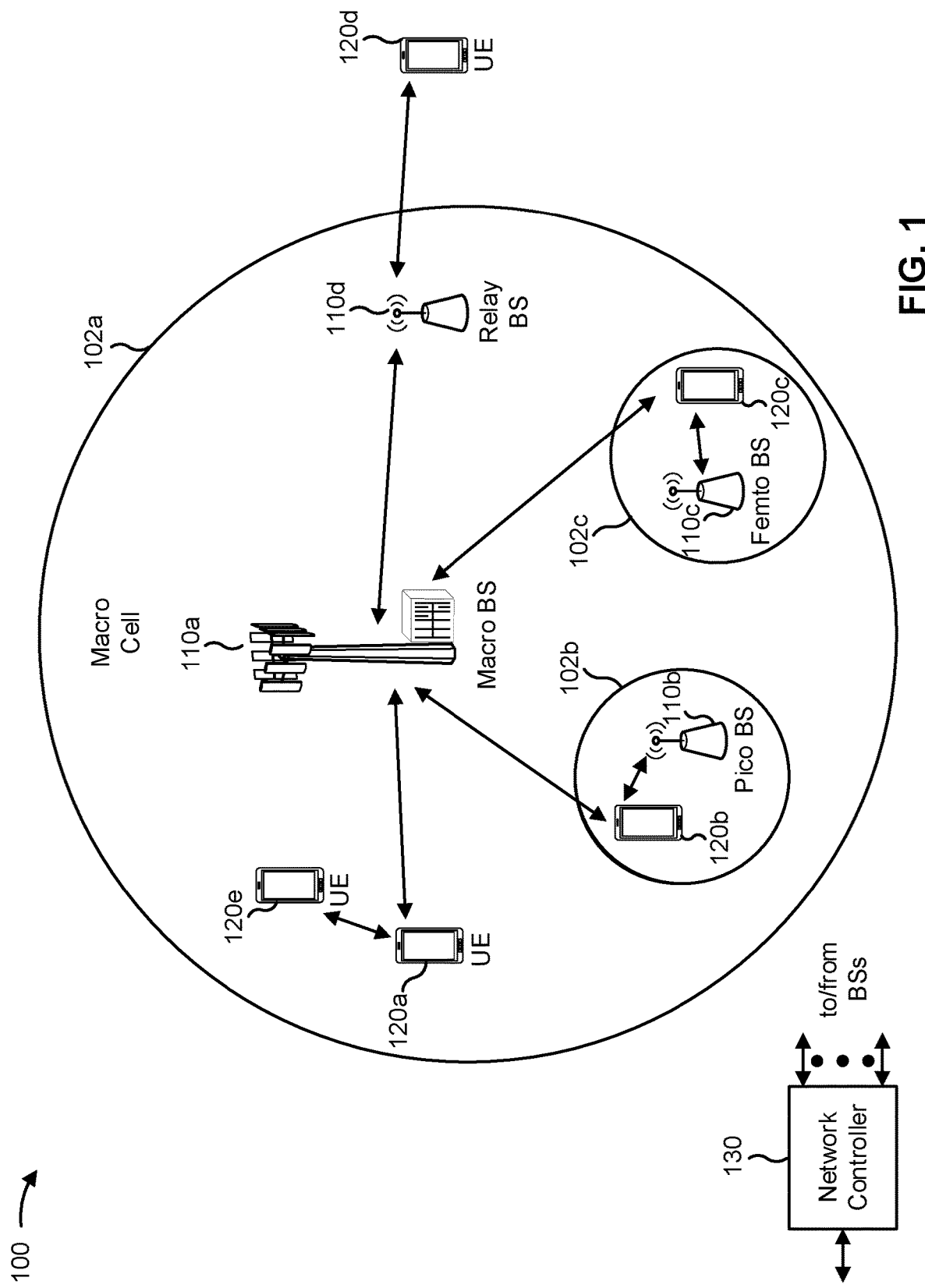
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
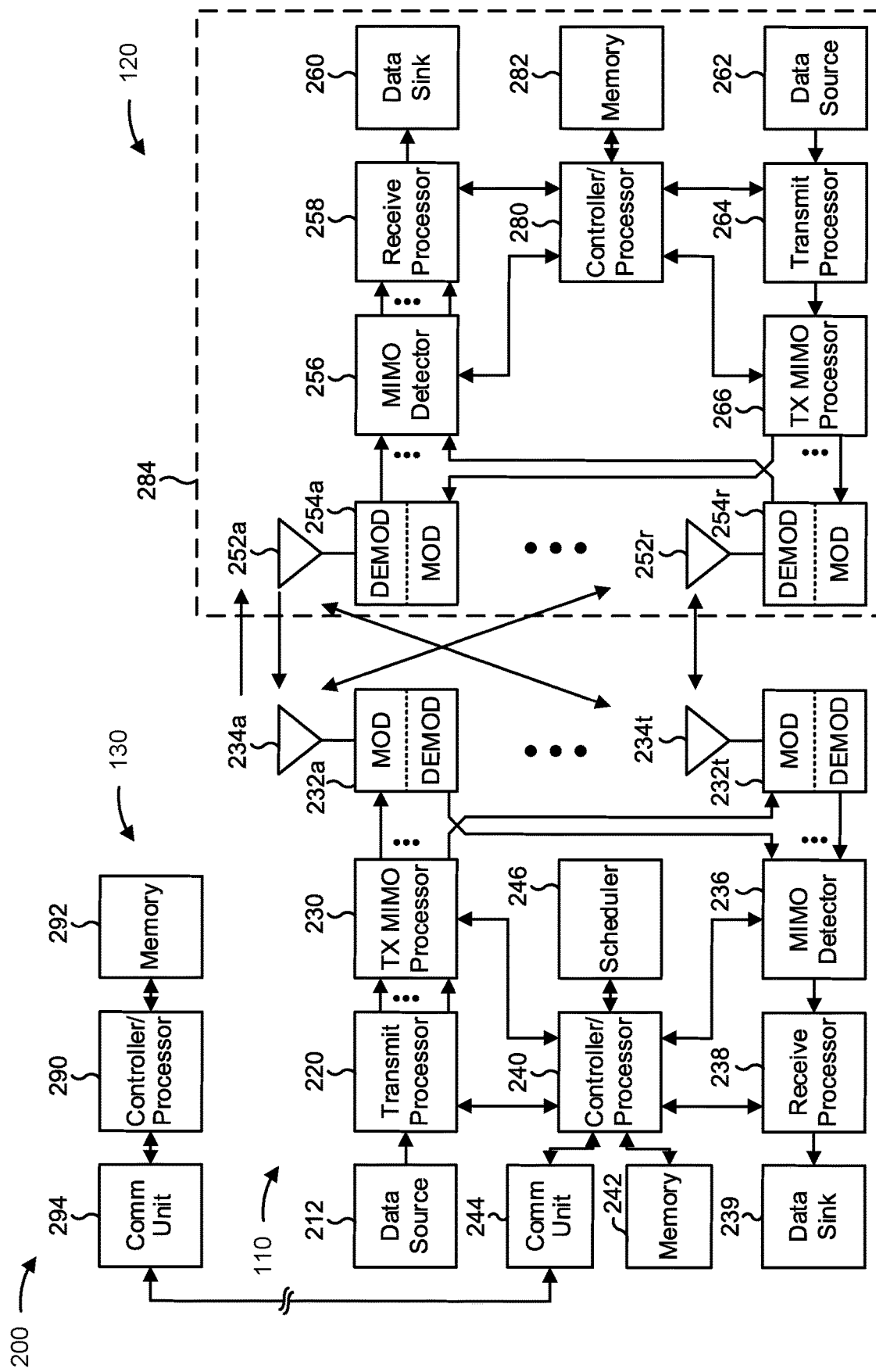
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-9).

Controller/processor 240 of base station 110, controller/processor 280 of UE 120, and/or any other component(s) of FIG. 2 may perform one or more techniques associated with capability reporting for a random access channel (RACH) procedure, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving, from a base station, an indication of a time gap value associated with a RACH procedure, wherein the time gap value is based at least in part on a capability of the base station, means for determining whether a physical RACH (PRACH) occasion associated with the RACH procedure is valid based at least in part on receiving the indication of the time gap value associated with the RACH procedure, means for selectively transmitting, to the base station, a PRACH transmission in the PRACH occasion based at least in part on determining whether the PRACH occasion is valid, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a time gap value associated with a RACH procedure based at least in part on a capability of the base station, means for transmitting an indication of the time gap value associated with the RACH procedure based at least in part on determining the time gap value associated with the RACH procedure, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
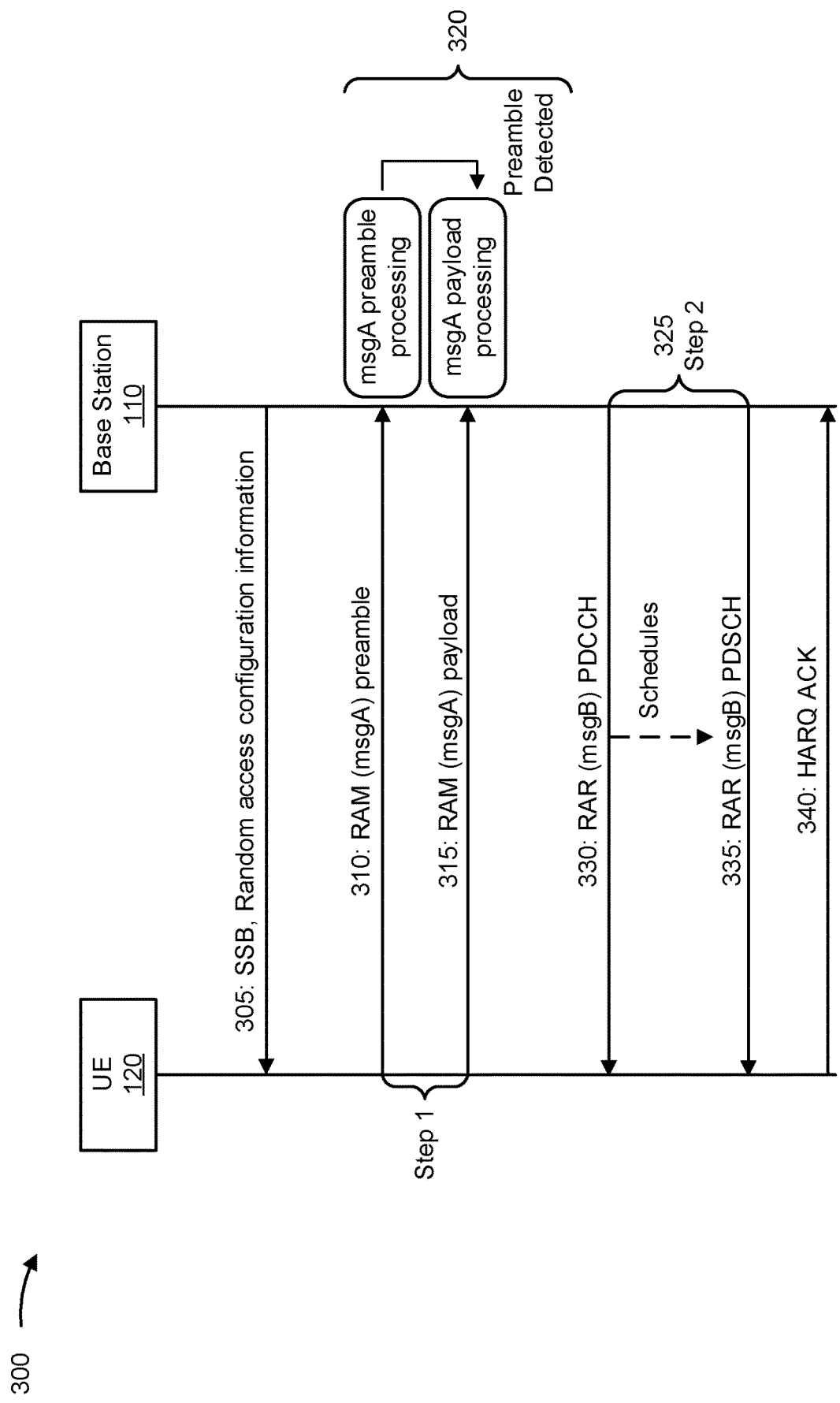
FIG. 3 is a diagram illustrating an example of a two-step random access procedure, in accordance with the present disclosure.

FIG. 3 is a diagram illustrating an example 300 of a two-step random access procedure, in accordance with the present disclosure. As shown in FIG. 3, a base station 110 and a UE 120 may communicate with one another to perform the two-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM), and/or receiving a random access response (RAR) to the RAM, among other examples.

As shown by reference number 310, the UE 120 may transmit, and the base station 110 may receive, a RAM preamble. As shown by reference number 315, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, and/or an initial message, among other examples, in a two-step random access procedure. Furthermore, in some aspects, the RAM preamble may be referred to as a message A preamble, a msgA preamble, a preamble, and/or a physical random access channel (PRACH) preamble, among other examples, and the RAM payload may be referred to as a message A payload, a msgA payload, and/or a payload, among other examples. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown by reference number 320, the base station 110 may receive the RAM preamble transmitted by the UE 120. If the base station 110 successfully receives and decodes the RAM preamble, the base station 110 may then receive and decode the RAM payload.

As shown by reference number 325, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information, among other examples.

As shown by reference number 330, as part of the second step of the two-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 335, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARD) acknowledgement (ACK).

As indicated above, FIG. 3 is provided as an example. Other examples may differ from what is described with regard to FIG. 3.

Figure 4:
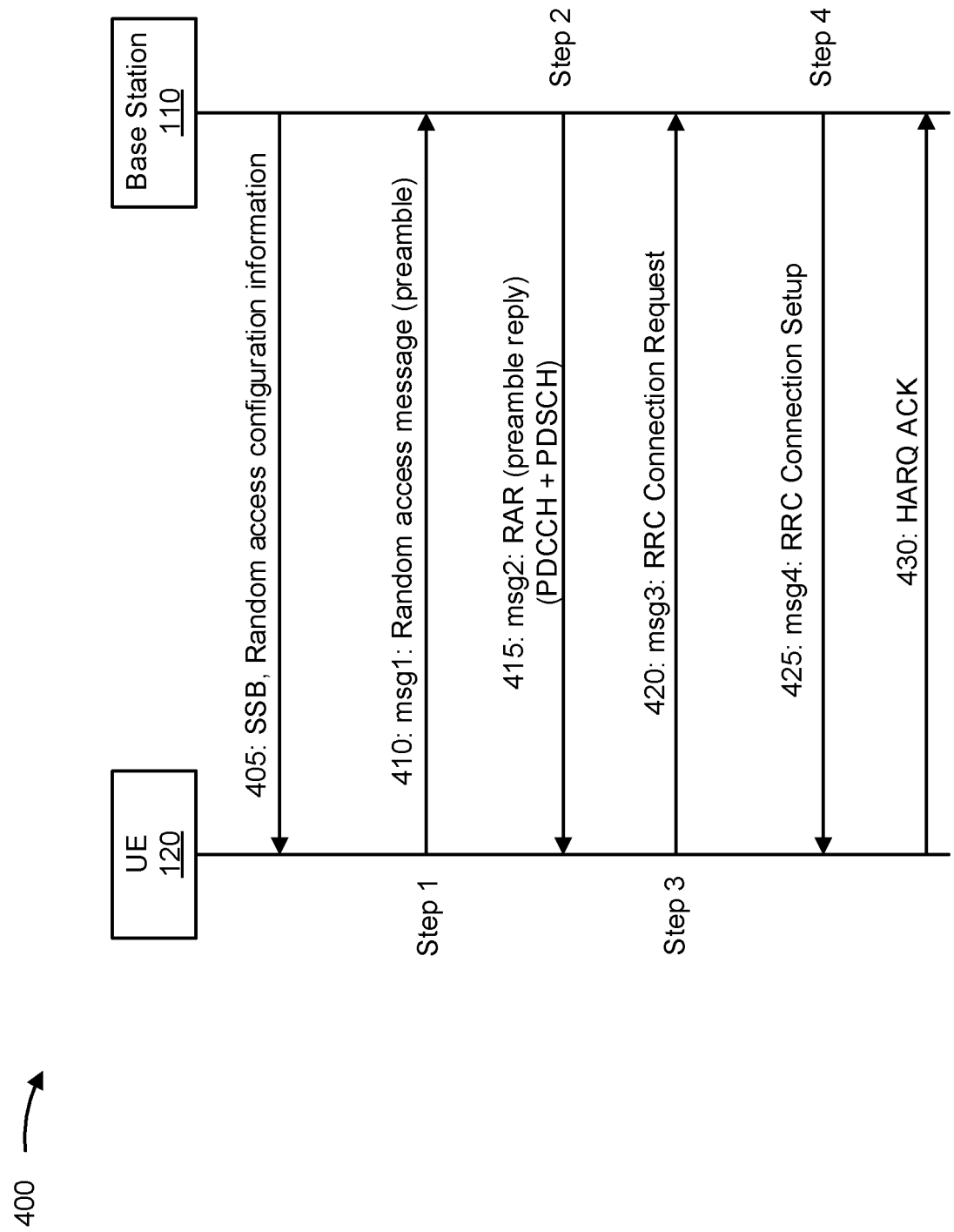
FIG. 4 is a diagram illustrating an example of a four-step random access procedure, in accordance with the present disclosure.

FIG. 4 is a diagram illustrating an example 400 of a four-step random access procedure, in accordance with the present disclosure. As shown in FIG. 4, a base station 110 and a UE 120 may communicate with one another to perform the four-step random access procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM, and/or one or more parameters for receiving an RAR, among other examples.

As shown by reference number 410, the UE 120 may transmit a RAM, which may include a preamble (sometimes referred to as a random access preamble, a PRACH preamble, and/or a RAM preamble). The message that includes the preamble may be referred to as a message 1, msg1, MSG1, a first message, and/or an initial message, in a four-step random access procedure. The random access message may include a random access preamble identifier.

As shown by reference number 415, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 420, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request), among other examples.

As shown by reference number 425, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information, among other examples. As shown by reference number 430, if the UE 120 successfully receives the RRC connection setup message, the UE 120 may transmit a HARQ ACK.

As indicated above, FIG. 4 is provided as an example. Other examples may differ from what is described with regard to FIG. 4.

In some wireless networks, a UE may receive random access configuration information indicating information associated with PRACH resources, such as a starting symbol for a PRACH, one or more PRACH slots, and/or a quantity of transmission opportunities (e.g., PRACH occasions) included in the one or more PRACH slots, among other examples. In some aspects, in unpaired spectrums, the UE may determine whether a PRACH occasion is valid based at least in part on a time gap between a time at which the UE receives an SSB and the time at which the PRACH occasion occurs. For example, the UE may determine whether a time gap between the SSB and the PRACH occasion satisfies a time gap value. The time gap value may be stored or pre-configured within the UE and may be based at least in part on a wireless communication standard, such as a 3GPP Technical Specification.

For example, for a UE that is not configured with a time-division duplex (TDD) uplink/downlink common configuration (e.g., a tdd-UL-DL-configurationCommon information element) for a frame structure, the UE may determine that a PRACH occasion in a PRACH slot is valid if the PRACH occasion does not precede an SSB in the PRACH slot and a first symbol of the PRACH occasion begins at least a quantity of symbols (defined by the time gap value) after a last SSB reception symbol. For a UE that is configured with a TDD uplink/downlink common configuration for the frame structure, the UE may determine that a PRACH occasion in a PRACH slot is valid if the PRACH occasion occurs during symbols designated for uplink (e.g., uplink symbols), if the PRACH occasion does not precede an SSB in the PRACH slot, and a first symbol of the PRACH occasion begins at least a quantity of symbols (defined by the time gap value) after a last SSB reception symbol.

The time gap value may allow for a base station to successfully receive the PRACH transmission transmitted in the PRACH occasion. For example, the time gap value may allow for a sufficient amount of time between SSB transmission at the base station and PRACH reception at the base station. The time gap value may be based at least in part on a subcarrier spacing (SCS) of a preamble (e.g., a PRACH preamble) of the RACH procedure. For example, preambles with an SCS of 15 kHz, 30 kHz, 60 kHz, or 120 kHz may be associated with a time gap value of 2 symbols.

In some cases, a base station may have a capability which enables the base station to support SSB transmission and PRACH reception at a higher level (e.g., with a smaller time gap or no time gap between SSB transmission and PRACH reception). For example, the base station may have a full duplex capability (e.g., the base station may be enabled to transmit and receive at substantially the same time). Additionally, in certain operating frequency bands, such as a millimeter wave band, a directionality of uplink beams and downlink beams may allow for the beams to have sufficient spatial diversity between them such that a time gap is not required at the base station. Further, larger SCSs (e.g., 960 kHz and/or similar SCSs) may be utilized in certain operating frequency bands, such as a high band, which support larger bandwidths with a sufficiently sized fast Fourier transform (FFT) such that a smaller time gap or no time gap between SSB transmission and PRACH reception is required at the base station. However, the UE may determine if a PRACH occasion is valid taking into account only the stored or pre-configured time gap value. As a result, the UE may determine that certain PRACH occasions are invalid using the stored or pre-configured time gap value where the base station is capable of receiving the PRACH transmission in the PRACH occasion. This may waste the PRACH occasions determined to be invalid where the UE is capable of transmitting in the PRACH occasion and the base station is capable of receiving the PRACH transmission (e.g., based at least in part on the capability of the base station), but the PRACH occasion does not satisfy the stored or pre-configured time gap value.

Some techniques and apparatuses described herein enable capability reporting for a RACH procedure. For example, a base station may determine a time gap value for the RACH procedure based at least in part on a capability of the base station. The base station may indicate the time gap value to one or more UEs. A UE that receives the indication of the time gap value may use the time gap value to determine whether a PRACH occasion is valid (e.g., rather than using a stored or pre-configured time gap value). As a result, PRACH occasions which would have otherwise been wasted (e.g., determined to be invalid by the UE using the stored or pre-configured time gap value) may be utilized by the UE and the base station. This improves network performance by enabling the UE to transmit in more PRACH occasions than if the UE were to determine valid PRACH occasions without considering the capability of the base station.

Figure 5:
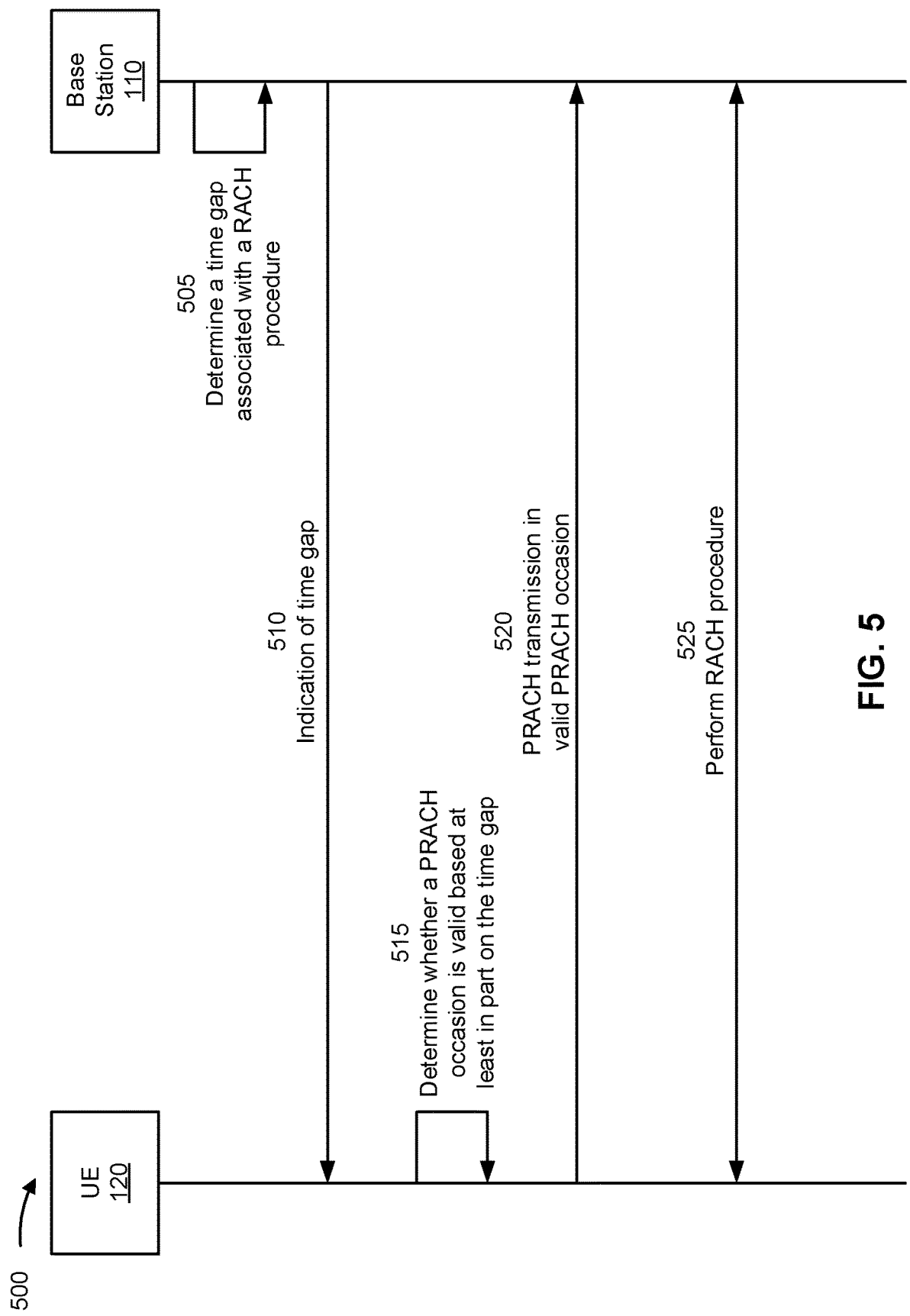
FIG. 5 is a diagram illustrating an example associated with capability reporting for a random access channel (RACH) procedure, in accordance with the present disclosure.

FIG. 5 is a diagram illustrating an example 500 associated with capability reporting for a RACH procedure, in accordance with the present disclosure. As shown in FIG. 5, a base station 110 and a UE 120 may communicate with one another in a wireless network (e.g., wireless network 100).

As show by reference number 505, the base station 110 may determine a time gap value associated with a RACH procedure based at least in part on a capability of the base station 110. The time gap value may be based at least in part on an amount of time the base station 110 needs to switch between transmitting an SSB and receiving a PRACH transmission. The capability of the base station 110 may be a full duplex capability of the base station 110, and/or a spatial diversity, at the base station, of a transmit beam and a receive beam for one or more RACH resources among other examples. For example, the base station 110 may support full duplex communication (e.g., the base station 110 may be capable of receiving and transmitting at the same time). As a result, the base station 110 may need little or no time between transmitting an SSB and receiving a PRACH transmission.

The base station 110 may determine that a RACH resource has sufficient spatial diversity such that the base station 110 may need little or no time between transmitting an SSB and receiving a PRACH transmission. For example, an SSB transmit beam and a PRACH receive beam for a specific RACH resource may have sufficient separation at the base station 110 to allow for little or no time between transmitting an SSB and receiving a PRACH transmission (e.g., the SSB transmit beam and the PRACH receive beam may be separated such that there is no or little interference between the SSB transmit beam and the PRACH receive beam).

In some aspects, the base station 110 may determine that the time gap value associated with the RACH procedure that is based at least in part on the capability of the base station 110 is different than a stored or pre-configured time gap value associated with the RACH procedure. For example, the base station 110 and/or the UE 120 may be pre-configured with a time gap value or have a stored time gap value for the RACH procedure. The stored or pre-configured time gap value may be based at least in part on a wireless communication standard, such as a 3GPP Technical Specification (e.g., 3GPP T.S. 38.213). The stored or pre-configured time gap value may not consider or may not be based at least in part on a capability of the base station 110. The base station 110 may determine that the time gap value that is based at least in part on the capability of the base station 110 is different than (or less than) a stored or pre-configured time gap value associated with the RACH procedure.

In some aspects, the base station 110 may determine the time gap value associated with the RACH procedure based at least in part on an SCS of a preamble associated with the RACH procedure (e.g., a PRACH preamble). In some aspects, the base station 110 may determine the time gap value associated with the RACH procedure as a function of the SCS of the preamble associated with the RACH procedure.

In some aspects, the base station 110 may determine that the time gap value associated with the RACH procedure is applicable to one or more (or all) RACH resources. For example, the base station 110 may advertise a set of RACH resources for the RACH procedure (e.g., in random access configuration information that is transmitted by the base station 110). The base station 110 may determine that the time gap value associated with the RACH procedure is applicable to all advertised RACH resources (e.g., where the base station 110 has a full duplex capability). In some aspects, the base station 110 may determine that the time gap value associated with the RACH procedure is applicable to a subset of RACH resources of all advertised RACH resources. For example, the base station 110 may determine that one or more RACH resources have a sufficient spatial diversity (e.g., between an SSB transmit beam and a PRACH receive beam at the base station 110). The base station 110 may determine that the time gap value associated with the RACH procedure is applicable to the one or more RACH resources that have a sufficient spatial diversity.

As shown by reference number 510, the base station 110 may transmit an indication of the time gap value associated with the RACH procedure, based at least in part on determining the time gap value associated with the RACH procedure. The base station 110 may transmit the indication of the time gap value associated with the RACH procedure using Layer 1 signaling, Layer 2 signaling, radio resource control (RRC) signaling, and/or broadcast signaling, among other examples. In some aspects, the indication of the time gap value associated with the RACH procedure may be included in random access configuration information that is transmitted by the base station 110. In some aspects, the base station 110 may configure a system information block (SIB) to include the indication of the time gap value associated with the RACH procedure. The base station 110 may transmit the SIB including the indication of the time gap value associated with the RACH procedure.

The UE 120 may receive the indication of the time gap value associated with the RACH procedure that is based at least in part on a capability of the base station. The UE 120 may determine one or more (or all) RACH resources that are associated with the time gap value based at least in part on the indication of the time gap value associated with the RACH procedure (e.g., the indication of the time gap value may indicate the RACH resources that are associated with the time gap value).

As shown by reference number 515, the UE 120 may determine whether a PRACH occasion associated with the RACH procedure is valid based at least in part on receiving the indication of the time gap value associated with the RACH procedure. For example, the UE 120 may determine a stored or pre-configured time gap value associated with the RACH procedure (e.g., the stored or pre-configured time gap value that is based at least in part on a wireless communication standard discussed above). The UE 120 may refrain from using the stored or pre-configured time gap value associated with the RACH procedure when determining whether the PRACH occasion associated with the RACH procedure is valid based at least in part on receiving the indication of the time gap value associated with the RACH procedure. That is, the UE 120 may replace the stored or pre-configured time gap value with the time gap value indicated by the base station 110 when determining whether a PRACH occasion associated with the RACH procedure is valid.

For example, the UE 120 may determine a starting symbol associated with a transmission opportunity associated with the RACH procedure (e.g., a PRACH occasion). The UE 120 may determine an ending symbol (e.g., a last symbol) of a last received SSB (e.g., the most recently received SSB). The UE 120 may determine whether a quantity of symbols between the ending symbol of the last received SSB and the starting symbol associated with the PRACH occasion satisfies the time gap value (e.g., indicated by the base station 110). For example, if the quantity of symbols between the ending symbol of the last received SSB and the starting symbol associated with the PRACH occasion is less than the time gap value, then the UE 120 may determine that the PRACH occasion is not valid (e.g., and the UE 120 may not transmit in the PRACH occasion). If the quantity of symbols between the ending symbol of the last received SSB and the starting symbol associated with the PRACH occasion is greater than or equal to the time gap value, then the UE 120 may determine that the PRACH occasion is valid (e.g., and the UE 120 may transmit in the PRACH occasion).

As shown by reference number 520, the UE 120 may selectively transmit, to the base station 110, a PRACH transmission in the PRACH occasion based at least in part on determining whether the PRACH occasion is valid. That is, if the UE 120 determines that the PRACH occasion is valid, then the UE 120 may transmit the PRACH transmission in the PRACH occasion. If the UE 120 determines that the PRACH occasion is not valid, then the UE 120 may not transmit the PRACH transmission in the PRACH occasion. In some aspects, the PRACH transmission may be a PRACH preamble associated with the RACH procedure. The base station 110 may selectively receive the PRACH transmission in the PRACH occasion in a similar manner as described above.

As shown by reference number 525, the base station 110 and the UE 120 may perform the RACH procedure using valid PRACH occasions (e.g., determined using the time gap value that is based at least in part on the capability of the base station 110). For example, the base station 110 and the UE 120 may perform a two-step RACH procedure (e.g., as described above with respect to FIG. 3), and/or a four-step RACH procedure (e.g., as described above with respect to FIG. 4).

As a result, PRACH occasions that would have otherwise been wasted (e.g., determined to be invalid by the UE 120 using the stored or pre-configured time gap value) may be utilized by the UE 120 and the base station 110 associated with a RACH procedure. This improves network performance by enabling the UE 120 to transmit in more PRACH occasions than if the UE 120 were to determine valid PRACH occasions without considering the capability of the base station 110.

As indicated above, FIG. 5 is provided as an example. Other examples may differ from what is described with respect to FIG. 5.

Figure 6:
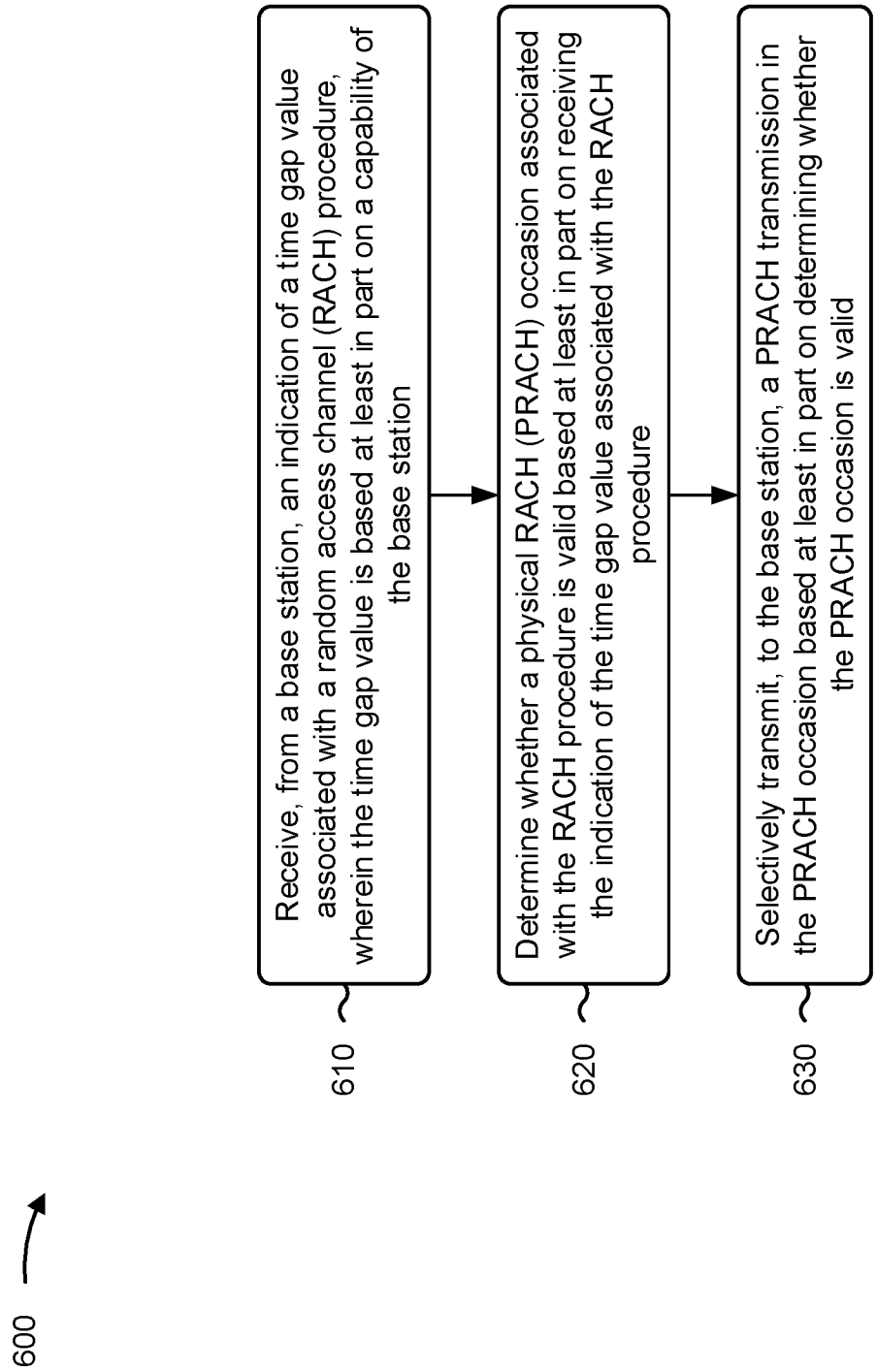
FIGS. 6-7 are diagrams illustrating example processes associated with capability reporting for a RACH procedure, in accordance with the present disclosure.

FIG. 6 is a diagram illustrating an example process 600 performed, for example, by a UE, in accordance with the present disclosure. Example process 600 is an example where the UE (e.g., UE 120) performs operations associated with capability reporting for a RACH procedure.

As shown in FIG. 6, in some aspects, process 600 may include receiving, from a base station, an indication of a time gap value associated with a RACH procedure, wherein the time gap value is based at least in part on a capability of the base station (block 610). For example, the UE (e.g., using antenna 252, DEMOD 254, MIMO detector 256, receive processor 258, transmit processor 264, controller/processor 280, and/or memory 282) may receive, from a base station, an indication of a time gap value associated with a RACH procedure, as described above. In some aspects, the time gap value is based at least in part on a capability of the base station.

As further shown in FIG. 6, in some aspects, process 600 may include determining whether a PRACH occasion associated with the RACH procedure is valid based at least in part on receiving the indication of the time gap value associated with the RACH procedure (block 620). For example, the UE (e.g., using receive processor 258, transmit processor 264, controller/processor 280, and/or memory 282) may determine whether a PRACH occasion associated with the RACH procedure is valid based at least in part on receiving the indication of the time gap value associated with the RACH procedure, as described above.

As further shown in FIG. 6, in some aspects, process 600 may include selectively transmitting, to the base station, a PRACH transmission in the PRACH occasion based at least in part on determining whether the PRACH occasion is valid (block 630). For example, the UE (e.g., using receive processor 258, transmit processor 264, controller/processor 280, TX MIMO processor 266, MOD 254, antenna 252, and/or memory 282) may selectively transmit, to the base station, a PRACH transmission in the PRACH occasion based at least in part on determining whether the PRACH occasion is valid, as described above.

Process 600 may include additional aspects, such as any single aspect or any combination of aspects described below and/or in connection with one or more other processes described elsewhere herein.

In a first aspect, determining whether the PRACH occasion associated with the RACH procedure is valid comprises determining a stored time gap value associated with the RACH procedure, and refraining from using the stored time gap value associated with the RACH procedure when determining whether the PRACH occasion associated with the RACH procedure is valid based at least in part on receiving the indication of the time gap value associated with the RACH procedure.

In a second aspect, alone or in combination with the first aspect, receiving the indication of the time gap value associated with the RACH procedure comprises receiving the indication of the time gap value associated with the RACH procedure using layer 1 signaling, layer 2 signaling, radio resource control signaling, or broadcast signaling.

In a third aspect, alone or in combination with one or more of the first and second aspects, receiving the indication of the time gap value associated with the RACH procedure comprises receiving a system information block including the indication of the time gap value associated with the RACH procedure.

In a fourth aspect, alone or in combination with one or more of the first through third aspects, the time gap value associated with the RACH procedure is based at least in part on a subcarrier spacing of a preamble associated with the RACH procedure.

In a fifth aspect, alone or in combination with one or more of the first through fourth aspects, receiving the indication of the time gap value associated with the RACH procedure comprises receiving an indication of a set of RACH resources associated with the RACH procedure, and receiving an indication of a subset of RACH resources, of the set of RACH resources, associated with the time gap value.

In a sixth aspect, alone or in combination with one or more of the first through fifth aspects, receiving the indication of the time gap value associated with the RACH procedure comprises receiving an indication of a set of RACH resources associated with the RACH procedure, and determining that the time gap value is associated with the set of RACH resources.

In a seventh aspect, alone or in combination with one or more of the first through sixth aspects, the capability of the base station is at least one of a full duplex capability of the base station, or a spatial diversity, at the base station, of a transmit beam and a receive beam for a RACH resource associated with the RACH procedure.

In an eighth aspect, alone or in combination with one or more of the first through seventh aspects, determining whether the PRACH occasion associated with the RACH procedure is valid comprises determining a starting symbol associated with the PRACH occasion, determining an ending symbol of a last received SSB, and determining whether a quantity of symbols between the ending symbol of the last received SSB and the starting symbol associated with the PRACH occasion satisfies the time gap value associated with the RACH procedure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
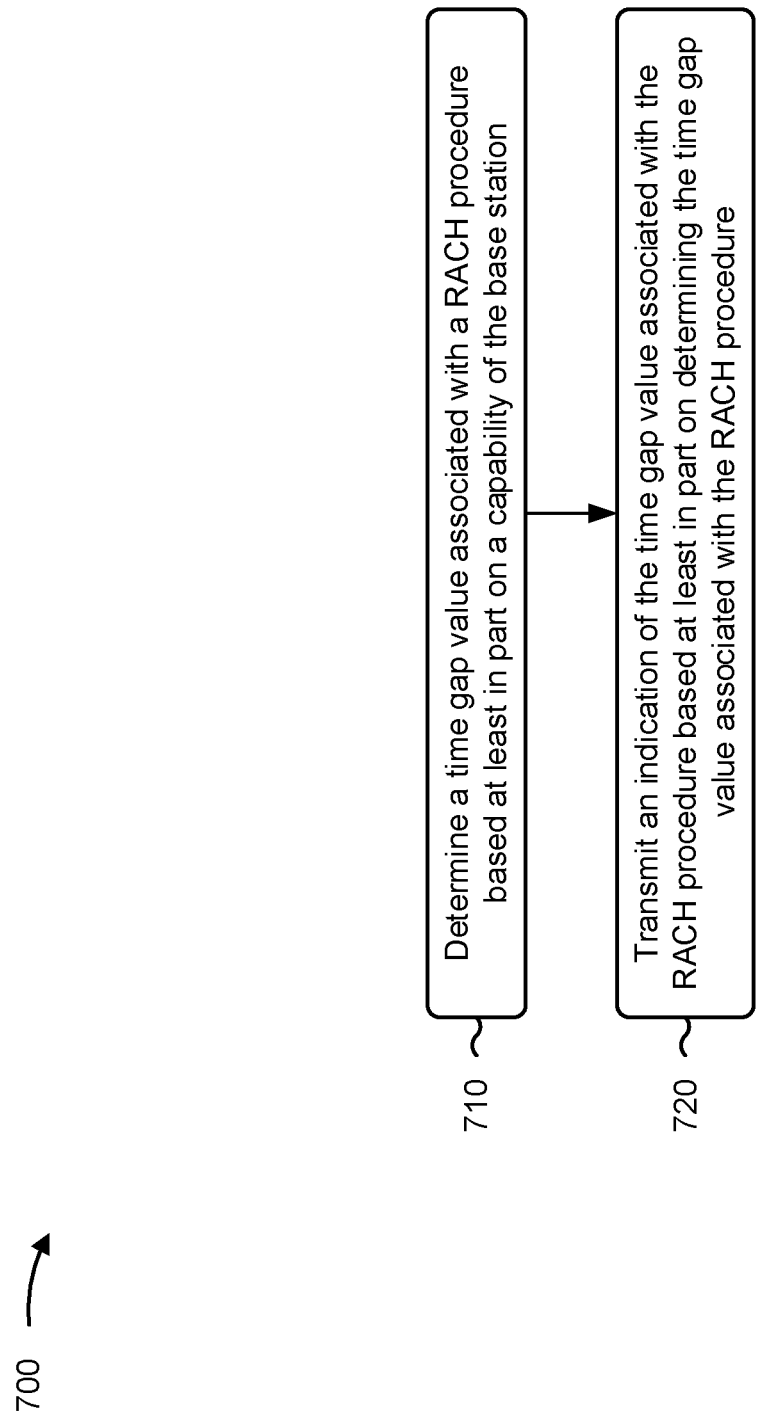

FIG. 7 is a diagram illustrating an example process 700 performed, for example, by a base station, in accordance with the present disclosure. Example process 700 is an example where the base station (e.g., base station 110) performs operations associated with capability reporting for random access channel procedure.

As shown in FIG. 7, in some aspects, process 700 may include determining a time gap value associated with a RACH procedure based at least in part on a capability of the base station (block 710). For example, the base station (e.g., using transmit processor 220, receive processor 238, controller/processor 240, and/or memory 242,) may determine a time gap value associated with a RACH procedure based at least in part on a capability of the base station, as described above.

As further shown in FIG. 7, in some aspects, process 700 may include transmitting an indication of the time gap value associated with the RACH procedure based at least in part on determining the time gap value associated with the RACH procedure (block 720). For example, the base station (e.g., using transmit processor 220, receive processor 238, controller/processor 240, TX MIMO processor 230, MOD 232, antenna 234, and/or memory 242) may transmit an indication of the time gap value associated with the RACH procedure based at least in part on determining the time gap value associated with the RACH procedure, as described above.

Process 700 may include additional aspects, such as any single aspect or any combination of aspects described below and/or in connection with one or more other processes described elsewhere herein.

In a first aspect, process 700 includes selectively receiving, from a UE, a PRACH transmission in a PRACH occasion based at least in part on a determination by the UE of whether the PRACH occasion is valid, wherein the determination by the UE of whether the PRACH occasion is valid is based at least in part on the time gap value associated with the RACH procedure.

In a second aspect, alone or in combination with the first aspect, determining the time gap value associated with the RACH procedure comprises determining a stored time gap value associated with the RACH procedure, and determining, based at least in part on the capability of the base station, that the time gap value associated with the RACH procedure is different than the stored time gap value associated with the RACH procedure.

In a third aspect, alone or in combination with one or more of the first and second aspects, transmitting the indication of the time gap value associated with the RACH procedure comprises transmitting the indication of the time gap value associated with the RACH procedure using layer 1 signaling, layer 2 signaling, radio resource control signaling, or broadcast signaling.

In a fourth aspect, alone or in combination with one or more of the first through third aspects, transmitting the indication of the time gap value associated with the RACH procedure comprises configuring an SIB to include the indication of the time gap value associated with the RACH procedure, and transmitting the SIB including the indication of the time gap value associated with the RACH procedure.

In a fifth aspect, alone or in combination with one or more of the first through fourth aspects, determining the time gap value associated with the RACH procedure comprises determining the time gap value associated with the RACH procedure based at least in part on a subcarrier spacing of a preamble associated with the RACH procedure.

In a sixth aspect, alone or in combination with one or more of the first through fifth aspects, determining the time gap value associated with the RACH procedure comprises determining a set of RACH resources associated with the RACH procedure, and determining a subset of RACH resources, of the set of RACH resources, associated with the time gap value.

In a seventh aspect, alone or in combination with one or more of the first through sixth aspects, determining the time gap value associated with the RACH procedure comprises determining a set of RACH resources associated with the RACH procedure, and determining that the time gap value is associated with the set of RACH resources.

In an eighth aspect, alone or in combination with one or more of the first through seventh aspects, the capability of the base station is at least one of a full duplex capability of the base station, or a spatial diversity, at the base station, of a transmit beam and a receive beam for a RACH resource.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
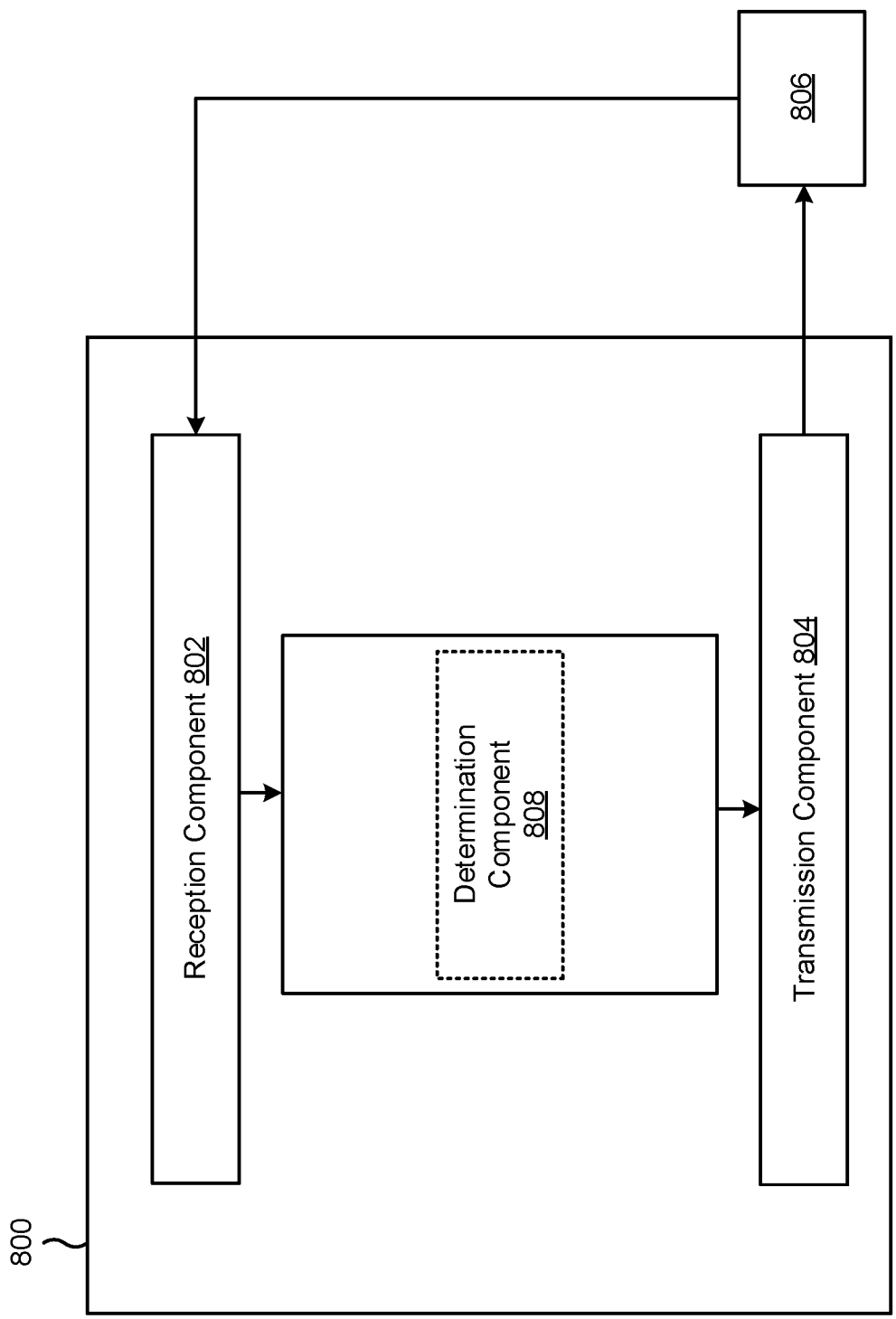
FIGS. 8-9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a determination component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the user equipment described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the user equipment described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the user equipment described above in connection with FIG. 2. In some aspects, the transmission component 804 may be co-located with the reception component 802 in a transceiver.

The reception component 802 may receive an indication of a time gap value associated with a RACH procedure, wherein the time gap value is based at least in part on a capability of a base station. The determination component 808 may determine whether a PRACH occasion associated with the RACH procedure is valid based at least in part on receiving the indication of the time gap value associated with the RACH procedure. The transmission component 804 may transmit a PRACH transmission in the PRACH occasion based at least in part on determining whether the PRACH occasion is valid.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
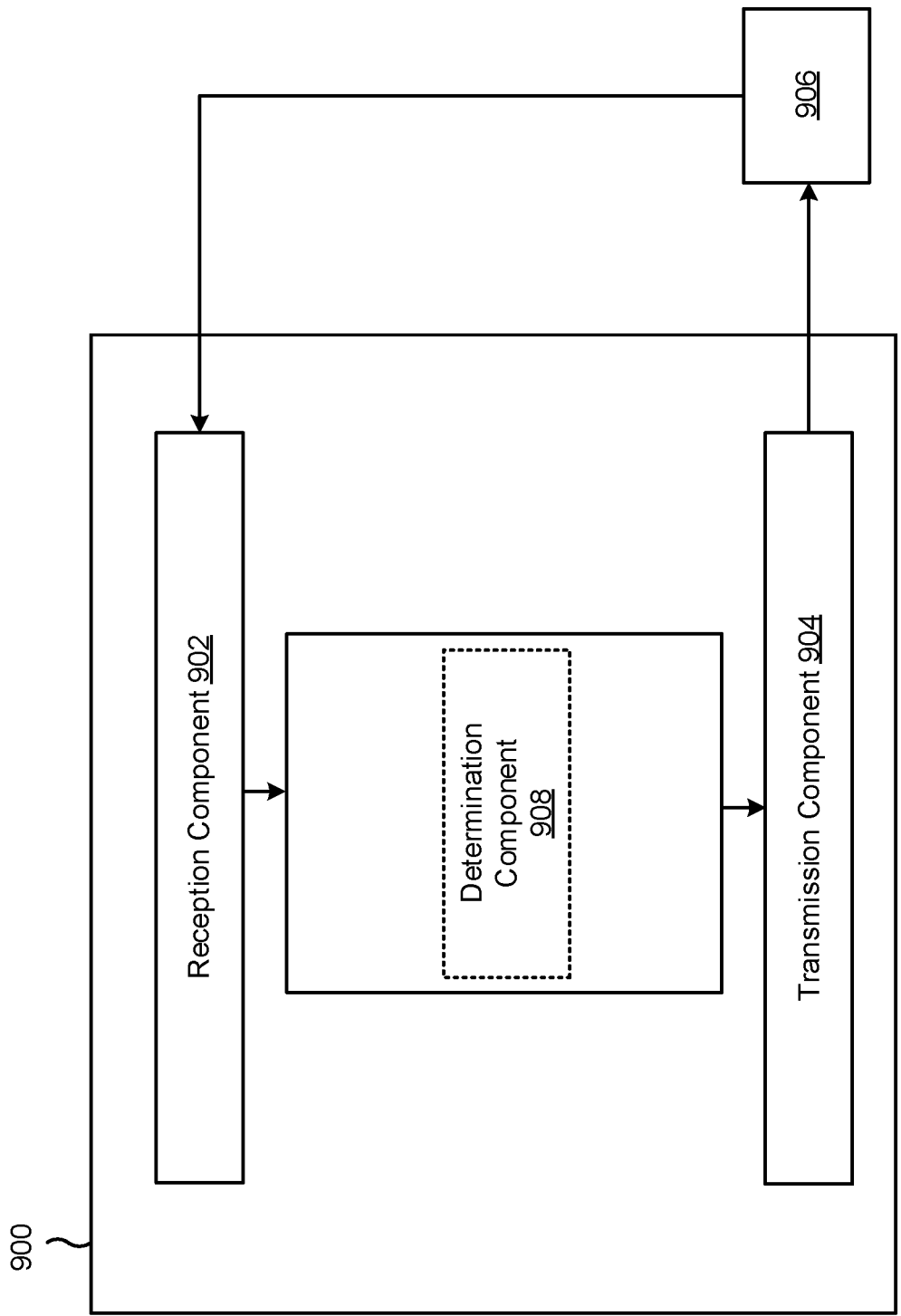

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The reception component 902 may selectively receive a PRACH transmission in a PRACH occasion. The determination component 908 may determine a time gap value associated with a RACH procedure based at least in part on a capability of the base station. The transmission component 904 may transmit an indication of the time gap value associated with the RACH procedure based at least in part on determining the time gap value associated with the RACH procedure.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, from a base station, an indication of a time gap value associated with a random access channel (RACH) procedure, wherein the time gap value is based at least in part on a capability of the base station; determining whether a physical RACH (PRACH) occasion associated with the RACH procedure is valid based at least in part on receiving the indication of the time gap value associated with the RACH procedure; and selectively transmitting, to the base station, a PRACH transmission in the PRACH occasion based at least in part on determining whether the PRACH occasion is valid.

Aspect 2: The method of Aspect 1, wherein determining whether the PRACH occasion associated with the RACH procedure is valid comprises: determining a stored time gap value associated with the RACH procedure; and refraining from using the stored time gap value associated with the RACH procedure when determining whether the PRACH occasion associated with the RACH procedure is valid based at least in part on receiving the indication of the time gap value associated with the RACH procedure.

Aspect 3: The method of any of Aspects 1-2, wherein receiving the indication of the time gap value associated with the RACH procedure comprises receiving the indication of the time gap value associated with the RACH procedure using: layer 1 signaling, layer 2 signaling, radio resource control signaling, or broadcast signaling.

Aspect 4: The method of any of Aspects 1-3, wherein receiving the indication of the time gap value associated with the RACH procedure comprises: receiving a system information block including the indication of the time gap value associated with the RACH procedure.

Aspect 5: The method of any of Aspects 1-4, wherein the time gap value associated with the RACH procedure is based at least in part on a subcarrier spacing of a preamble associated with the RACH procedure.

Aspect 6: The method of any of Aspects 1-5, wherein receiving the indication of the time gap value associated with the RACH procedure comprises: receiving an indication of a set of RACH resources associated with the RACH procedure; and receiving an indication of a subset of RACH resources, of the set of RACH resources, associated with the time gap value.

Aspect 7: The method of any of Aspects 1-5, wherein receiving the indication of the time gap value associated with the RACH procedure comprises: receiving an indication of a set of RACH resources associated with the RACH procedure; and determining that the time gap value is associated with the set of RACH resources.

Aspect 8: The method of any of Aspects 1-5, wherein receiving the indication of the time gap value associated with the RACH procedure comprises: receiving an indication of a set of RACH resources associated with the RACH procedure; and receiving an indication of at least one of: a subset of RACH resources, of the set of RACH resources, associated with the time gap value, or that the time gap value is associated with the set of RACH resources Aspect 9: The method of any of Aspects 1-8, wherein the capability of the base station is at least one of: a full duplex capability of the base station, or a spatial diversity, at the base station, of a transmit beam and a receive beam for a RACH resource associated with the RACH procedure.

Aspect 10: The method of any of Aspects 1-9, wherein determining whether the PRACH occasion associated with the RACH procedure is valid comprises: determining a starting symbol associated with the PRACH occasion; determining an ending symbol of a last received synchronization signal block (SSB); and determining whether a quantity of symbols between the ending symbol of the last received SSB and the starting symbol associated with the PRACH occasion satisfies the time gap value associated with the RACH procedure.

Aspect 11: A method of wireless communication performed by a base station, comprising: determining a time gap value associated with a random access channel (RACH) procedure based at least in part on a capability of the base station; and transmitting an indication of the time gap value associated with the RACH procedure based at least in part on determining the time gap value associated with the RACH procedure.

Aspect 12: The method of Aspect 11, further comprising: selectively receiving, from a user equipment (UE), a physical RACH (PRACH) transmission in a PRACH occasion based at least in part on a determination by the UE of whether the PRACH occasion is valid, wherein the determination by the UE of whether the PRACH occasion is valid is based at least in part on the time gap value associated with the RACH procedure.

Aspect 13: The method of any of Aspects 11-12, wherein determining the time gap value associated with the RACH procedure comprises: determining a stored time gap value associated with the RACH procedure; and determining, based at least in part on the capability of the base station, that the time gap value associated with the RACH procedure is different than the stored time gap value associated with the RACH procedure.

Aspect 14: The method of any of Aspects 11-13, wherein transmitting the indication of the time gap value associated with the RACH procedure comprises transmitting the indication of the time gap value associated with the RACH procedure using: layer 1 signaling, layer 2 signaling, radio resource control signaling, or broadcast signaling.

Aspect 15: The method of any of Aspects 11-14, wherein transmitting the indication of the time gap value associated with the RACH procedure comprises: configuring a system information block (SIB) to include the indication of the time gap value associated with the RACH procedure; and transmitting the SIB including the indication of the time gap value associated with the RACH procedure.

Aspect 16: The method of any of Aspects 11-15, wherein determining the time gap value associated with the RACH procedure comprises: determining the time gap value associated with the RACH procedure based at least in part on a subcarrier spacing of a preamble associated with the RACH procedure.

Aspect 17: The method of any of Aspects 11-16, wherein determining the time gap value associated with the RACH procedure comprises: determining a set of RACH resources associated with the RACH procedure; and determining a subset of RACH resources, of the set of RACH resources, associated with the time gap value.

Aspect 18: The method of any of Aspects 11-16, wherein determining the time gap value associated with the RACH procedure comprises: determining a set of RACH resources associated with the RACH procedure; and determining that the time gap value is associated with the set of RACH resources.

Aspect 19: The method of any of Aspects 10-18, wherein the capability of the base station is at least one of: a full duplex capability of the base station, or a spatial diversity, at the base station, of a transmit beam and a receive beam for a RACH resource.

Aspect 20: An apparatus for wireless communication at a device, comprising a processor; memory coupled with the processor; and instructions stored in the memory and executable by the processor to cause the apparatus to perform the method of one or more Aspects of Aspects 1-10.

Aspect 21: A device for wireless communication, comprising a memory and one or more processors coupled to the memory, the memory and the one or more processors configured to perform the method of one or more Aspects of Aspects 1-10.

Aspect 22: An apparatus for wireless communication, comprising at least one means for performing the method of one or more Aspects of Aspects 1-10.

Aspect 23: A non-transitory computer-readable medium storing code for wireless communication, the code comprising instructions executable by a processor to perform the method of one or more Aspects of Aspects 1-10.

Aspect 24: A non-transitory computer-readable medium storing a set of instructions for wireless communication, the set of instructions comprising one or more instructions that, when executed by one or more processors of a device, cause the device to perform the method of one or more Aspects of Aspects 1-10.

Aspect 25: An apparatus for wireless communication at a device, comprising a processor; memory coupled with the processor; and instructions stored in the memory and executable by the processor to cause the apparatus to perform the method of one or more Aspects of Aspects 11-19.

Aspect 26: A device for wireless communication, comprising a memory and one or more processors coupled to the memory, the memory and the one or more processors configured to perform the method of one or more Aspects of Aspects 11-19.

Aspect 27: An apparatus for wireless communication, comprising at least one means for performing the method of one or more Aspects of Aspects 11-19.

Aspect 28: A non-transitory computer-readable medium storing code for wireless communication, the code comprising instructions executable by a processor to perform the method of one or more Aspects of Aspects 11-19.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 11-19.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a network entity, an indication of a time gap value associated with a random access channel (RACH) procedure, wherein the time gap value is different than a stored time gap value associated with the RACH procedure, the time gap value being based at least in part on a multiplexing capability of the network entity, the multiplexing capability of the network entity being at least one of:
   a full duplex capability of the network entity, or
   a spatial diversity, at the network entity, of a transmit beam and a receive beam for a RACH resource associated with the RACH procedure; and
   selectively transmitting, to the network entity, a physical RACH (PRACH) transmission in a PRACH occasion based at least in part on whether the PRACH occasion is valid, the validity of the PRACH occasion being based at least in part on receiving the indication of the time gap value associated with the RACH procedure, replacing the stored time gap value with the time gap value indicated by the network entity, and a quantity of symbols between an ending symbol of a last received synchronization signal block (SSB) and a starting symbol of the PRACH occasion satisfying the time gap value indicated by the network entity.

2. The method of claim 1, further comprising:
   determining the stored time gap value associated with the RACH procedure; and
   refraining from using the stored time gap value associated with the RACH procedure based at least in part on receiving the indication of the time gap value associated with the RACH procedure.

3. The method of claim 1, wherein receiving the indication of the time gap value associated with the RACH procedure comprises receiving the indication of the time gap value associated with the RACH procedure using:
   layer 1 signaling,
   layer 2 signaling,
   radio resource control signaling, or
   broadcast signaling.

4. The method of claim 1, wherein the time gap value associated with the RACH procedure is based at least in part on a subcarrier spacing of a preamble associated with the RACH procedure.

5. The method of claim 1, wherein receiving the indication of the time gap value associated with the RACH procedure comprises:
receiving an indication of a set of RACH resources associated with the RACH procedure; and
receiving an indication of at least one of:
a subset of RACH resources, of the set of RACH resources, associated with the time gap value, or
that the time gap value is associated with the set of RACH resources.

6. The method of claim 1, wherein the time gap value is further based at least in part on an amount of time the network entity uses to switch between transmitting an SSB and receiving the PRACH transmission.

7. A method of wireless communication performed by a network entity, comprising:
determining a time gap value associated with a random access channel (RACH) procedure, wherein the time gap value is different than a stored time gap value associated with the RACH procedure, the time gap value being based at least in part on a multiplexing capability of the network entity, the multiplexing capability of the network entity being at least one of:
a full duplex capability of the network entity, or
a spatial diversity, at the network entity, of a transmit beam and a receive beam for a RACH resource associated with the RACH procedure;
transmitting an indication of the time gap value associated with the RACH procedure based at least in part on determining the time gap value associated with the RACH procedure and replacing the stored time gap value with the determined time gap value;
selectively receiving, from a user equipment (UE), a physical RACH (PRACH) transmission in a PRACH occasion based at least in part on a determination by the UE of whether the PRACH occasion is valid, wherein the determination by the UE of whether the PRACH occasion is valid is based at least in part on the time gap value associated with the RACH procedure and a quantity of symbols between an ending symbol of a last synchronization signal block (SSB) and a starting symbol of the PRACH occasion satisfying the determined time gap value.

8. The method of claim 7, wherein determining the time gap value associated with the RACH procedure comprises:
determining the stored time gap value associated with the RACH procedure; and
determining, based at least in part on the multiplexing capability of the network entity, that the time gap value associated with the RACH procedure is different than the stored time gap value associated with the RACH procedure.

9. The method of claim 7, wherein transmitting the indication of the time gap value associated with the RACH procedure comprises transmitting the indication of the time gap value associated with the RACH procedure using:
layer 1 signaling,
layer 2 signaling,
radio resource control signaling, or
broadcast signaling.

10. The method of claim 7, wherein determining the time gap value associated with the RACH procedure comprises:
determining the time gap value associated with the RACH procedure based at least in part on a subcarrier spacing of a preamble associated with the RACH procedure.

11. The method of claim 7, wherein determining the time gap value associated with the RACH procedure comprises:

determining a set of RACH resources associated with the RACH procedure; and
determining a subset of RACH resources, of the set of RACH resources, associated with the time gap value.

12. The method of claim 11, wherein transmitting the indication of the time gap value comprises:
transmitting an indication of the set of RACH resources associated with the RACH procedure; and
transmitting an indication of the subset of RACH resources, of the set of RACH resources, associated with the time gap value.

13. The method of claim 7, wherein determining the time gap value associated with the RACH procedure comprises:
determining a set of RACH resources associated with the RACH procedure; and
determining that the time gap value is associated with the set of RACH resources.

14. The method of claim 13, wherein transmitting the indication of the time gap value comprises:
transmitting an indication of the set of RACH resources associated with the RACH procedure; and
transmitting an indication that the time gap value is associated with the set of RACH resources.

15. The method of claim 7, wherein the time gap value is further based at least in part on an amount of time the network entity uses to switch between transmitting an SSB and receiving a physical RACH (PRACH) the PRACH transmission.

16. A user equipment (UE) for wireless communication, comprising:
a memory; and
one or more processors, coupled to the memory, configured to:
receive, from a network entity, an indication of a time gap value associated with a random access channel (RACH) procedure, wherein the time gap value is different than a stored time gap value associated with the RACH procedure, the time gap value being based at least in part on a multiplexing capability of the network entity, the multiplexing capability of the network entity being at least one of:
a full duplex capability of the network entity, or
a spatial diversity, at the network entity, of a transmit beam and a receive beam for a RACH resource associated with the RACH procedure; and
selectively transmit, to the network entity, a physical RACH (PRACH) transmission in a PRACH occasion based at least in part on whether the PRACH occasion is valid, the validity of the PRACH occasion being based at least in part on receiving the indication of the time gap value associated with the RACH procedure, replacing the stored time gap value with the time gap value indicated by the network entity, and a quantity of symbols between an ending symbol of a last received synchronization signal block (SSB) and a starting symbol of the PRACH occasion satisfying the time gap value indicated by the network entity.

17. The UE of claim 16, wherein the one or more processors are further configured to:
determine the stored time gap value associated with the RACH procedure; and
refrain from using the stored time gap value associated with the RACH procedure based at least in part on receiving the indication of the time gap value associated with the RACH procedure.

18. The UE of claim 16, wherein the one or more processors, to receive the indication of the time gap value associated with the RACH procedure, are configured to receive the indication of the time gap value associated with the RACH procedure using:
 layer 1 signaling,
 layer 2 signaling,
 radio resource control signaling, or
 broadcast signaling.

19. The UE of claim 16, wherein the time gap value associated with the RACH procedure is based at least in part on a subcarrier spacing of a preamble associated with the RACH procedure.

20. The UE of claim 16, wherein the one or more processors, to receive the indication of the time gap value associated with the RACH procedure, are configured to:
 receive an indication of a set of RACH resources associated with the RACH procedure; and
 receive an indication of at least one of:
  a subset of RACH resources, of the set of RACH resources, associated with the time gap value, or
  that the time gap value is associated with the set of RACH resources.

21. The UE of claim 16, wherein the time gap value is further based at least in part on an amount of time the network entity uses to switch between transmitting an SSB and receiving the PRACH transmission.

22. A network entity for wireless communication, comprising:
 a memory; and
 one or more processors, coupled to the memory, configured to:
  determine a time gap value associated with a random access channel (RACH) procedure, wherein the time gap value is different than a stored time gap value associated with the RACH procedure, the time gap value being based at least in part on a multiplexing capability of the network entity, the multiplexing capability of the network entity being at least one of:
   a full duplex capability of the network entity, or
   a spatial diversity, at the network entity, of a transmit beam and a receive beam for a RACH resource associated with the RACH procedure;
  transmit an indication of the time gap value associated with the RACH procedure based at least in part on determining the time gap value associated with the RACH procedure and replacing the stored time gap value with the determined time gap value; and
  selectively receive, from a user equipment (UE), a physical RACH (PRACH) transmission in a PRACH occasion based at least in part on a determination by the UE of whether the PRACH occasion is valid, wherein the determination by the UE of whether the PRACH occasion is valid is based at least in part on the time gap value associated with the RACH procedure and a quantity of symbols between an ending symbol of a last synchronization signal block (SSB) and a starting symbol of the PRACH occasion satisfying the determined time gap value.

23. The network entity of claim 22, wherein the one or more processors, to determine the time gap value associated with the RACH procedure, are configured to:
 determine the stored time gap value associated with the RACH procedure; and
 determine, based at least in part on the multiplexing capability of the network entity, that the time gap value associated with the RACH procedure is different than the stored time gap value associated with the RACH procedure.

24. The network entity of claim 22, wherein the one or more processors, to transmit the indication of the time gap value associated with the RACH procedure, are configured to transmit the indication of the time gap value associated with the RACH procedure using:
 layer 1 signaling,
 layer 2 signaling,
 radio resource control signaling, or
 broadcast signaling.

25. The network entity of claim 22, wherein the one or more processors, to determine the time gap value associated with the RACH procedure, are configured to:
 determine the time gap value associated with the RACH procedure based at least in part on a subcarrier spacing of a preamble associated with the RACH procedure.

26. The network entity of claim 22, wherein the one or more processors, to determine the time gap value associated with the RACH procedure, are configured to:
 determine a set of RACH resources associated with the RACH procedure; and
 determine a subset of RACH resources, of the set of RACH resources, associated with the time gap value.

27. The network entity of claim 26, wherein the one or more processors, to transmit the indication of the time gap value, are configured to:
 transmit an indication of the set of RACH resources associated with the RACH procedure; and
 transmit an indication of the subset of RACH resources, of the set of RACH resources, associated with the time gap value.

28. The network entity of claim 22, wherein the one or more processors, to determine the time gap value associated with the RACH procedure, are configured to:
 determine a set of RACH resources associated with the RACH procedure; and
 determine that the time gap value is associated with the set of RACH resources.

29. The network entity of claim 28, wherein the one or more processors, to transmit the indication of the time gap value, are configured to:
 transmit an indication of the set of RACH resources associated with the RACH procedure; and
 transmit an indication that the time gap value is associated with the set of RACH resources.

30. The network entity of claim 22, wherein the time gap value is further based at least in part on an amount of time the network entity uses to switch between transmitting an SSB and receiving the PRACH transmission.

* * * * *